United States Patent [19]

Benson et al.

[11] Patent Number: 4,938,657
[45] Date of Patent: Jul. 3, 1990

[54] SHINGLE STACKING MACHINE

[75] Inventors: Bruce V. Benson, Roselle; Ashraf A. Siddigi, Bensenville, both of Ill.

[73] Assignee: Reichel & Drews, Inc., Itasca, Ill.

[21] Appl. No.: 349,512

[22] Filed: May 9, 1989

[51] Int. Cl.$^5$ ............................................ B65H 31/30
[52] U.S. Cl. ............................... 414/790.4; 271/188; 271/192; 271/209; 414/790.6; 414/790.8; 414/793.9
[58] Field of Search ............... 414/789.9, 790.4, 790.5, 414/790.6, 790.8, 793.9, 794.2, 794.4, 794; 271/192, 188, 209; 198/624

[56] References Cited

U.S. PATENT DOCUMENTS

| | | | |
|---|---|---|---|
| 1,365,741 | 1/1921 | Speer | 414/790.6 X |
| 3,052,468 | 9/1962 | Cutaia et al. | 271/188 |
| 3,154,307 | 10/1964 | Williamson | |
| 3,166,206 | 1/1965 | Porter et al. | 414/794 X |
| 3,205,794 | 9/1965 | Califano et al. | |
| 3,264,917 | 8/1966 | Califano et al. | |
| 3,312,357 | 4/1967 | Stephens et al. | 414/794 X |
| 3,378,121 | 4/1968 | Foret | |
| 3,725,183 | 4/1973 | Brookhyser et al. | 414/794.4 X |
| 3,831,781 | 8/1974 | Anikanov et al. | 414/790.6 |
| 4,059,203 | 11/1977 | Wright | 271/188 X |
| 4,083,552 | 4/1978 | Sioman | 414/794 X |
| 4,124,128 | 11/1978 | Adams et al. | 414/790.6 X |
| 4,313,669 | 2/1982 | Larson et al. | 271/209 X |
| 4,354,408 | 10/1982 | Carte | 271/188 X |
| 4,381,833 | 5/1983 | Foret | |
| 4,384,813 | 5/1983 | Smith et al. | 414/790.6 X |

FOREIGN PATENT DOCUMENTS

| | | | |
|---|---|---|---|
| 1236412 | 3/1967 | Fed. Rep. of Germany | 414/790.8 |
| 0196450 | 8/1988 | Japan | 271/188 |
| 1375835 | 11/1974 | United Kingdom | 198/624 |

OTHER PUBLICATIONS

Stacking Apparatus Assembly Drawing (3 sheets; May 17, 1983) including Hilliard Brochure (5 pages, 1988).

Primary Examiner—Robert J. Spar
Assistant Examiner—William M. Hienz
Attorney, Agent, or Firm—Dressler,Goldsmith,Shore, Sutker & Milnamow, Ltd.

[57] ABSTRACT

A shingle stacking machine including a shingle stacking station, a shingle bundling station, and a conveyor for removing bundled shingles from the machine. The shingle stacking station includes a pair of parallel and elongated wheel assemblies rotatably mounted to a frame of the machine. A drive mechanism is provided for rotatably indexing each wheel assembly during a drive mode of operation and permits free wheeling of the wheel assemblies during a jam mode of operation. The drive mechanism includes a motor for continuously driving a vacuum operated clutch assembly. The clutch assembly includes a pair of electromagnetic valves for controlling operation of a drive shaft which is connected to the wheel assemblies through an elastomeric belt drive. The shingle bundling station is disposed beneath the shingle stacking station and includes a pair of shelf-like supports pivotally carried on the machine frame. The shelf-like supports are interconnected by an intermeshing gear arrangement driven by a linear actuator. A series of drivers are also provided to align the end and side edges of the shingles deposited at the bundling station. The conveyor apparatus is disposed beneath the bundling station for removing bundles of shingles to an area remote from the shingle stacking machine.

8 Claims, 4 Drawing Sheets

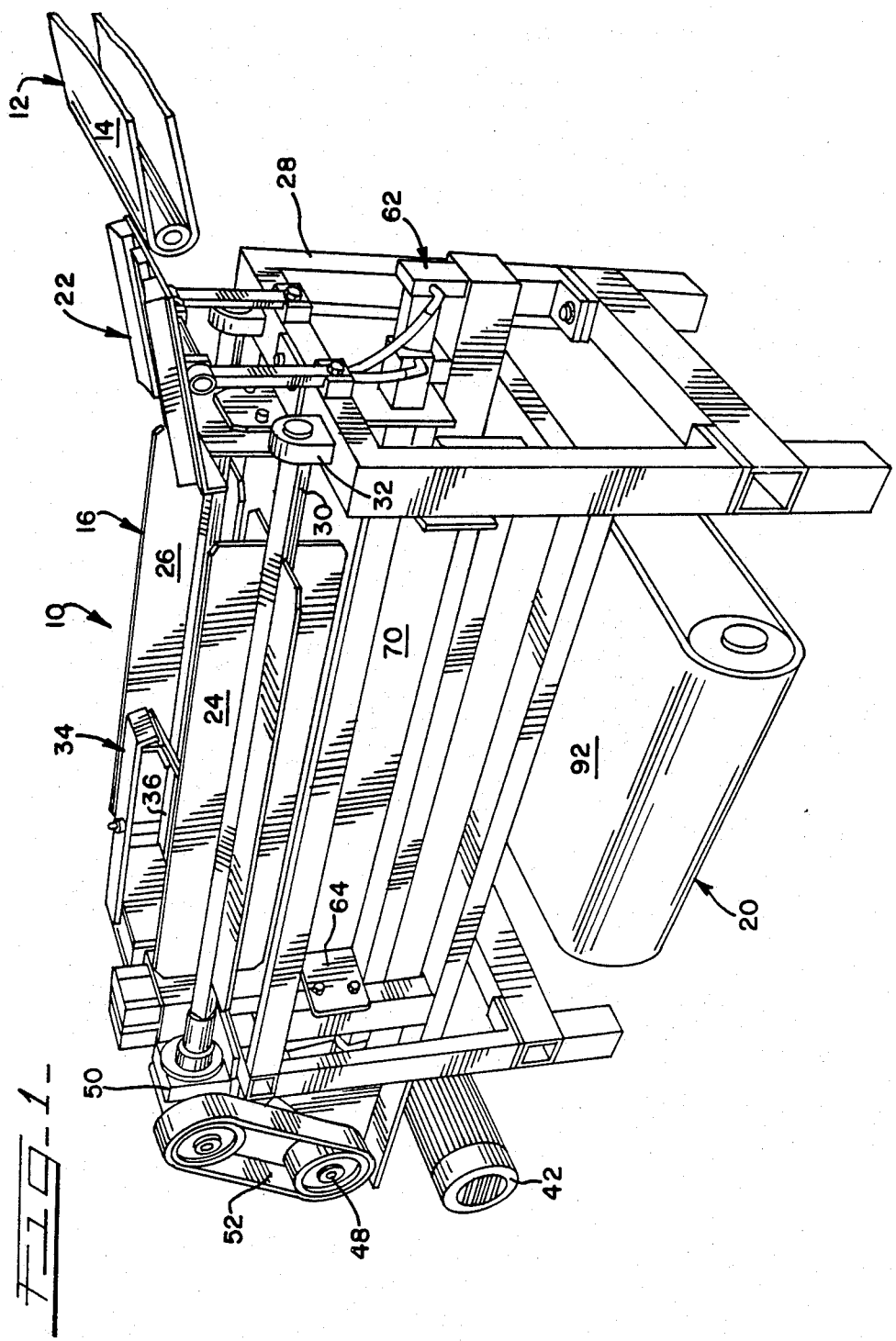

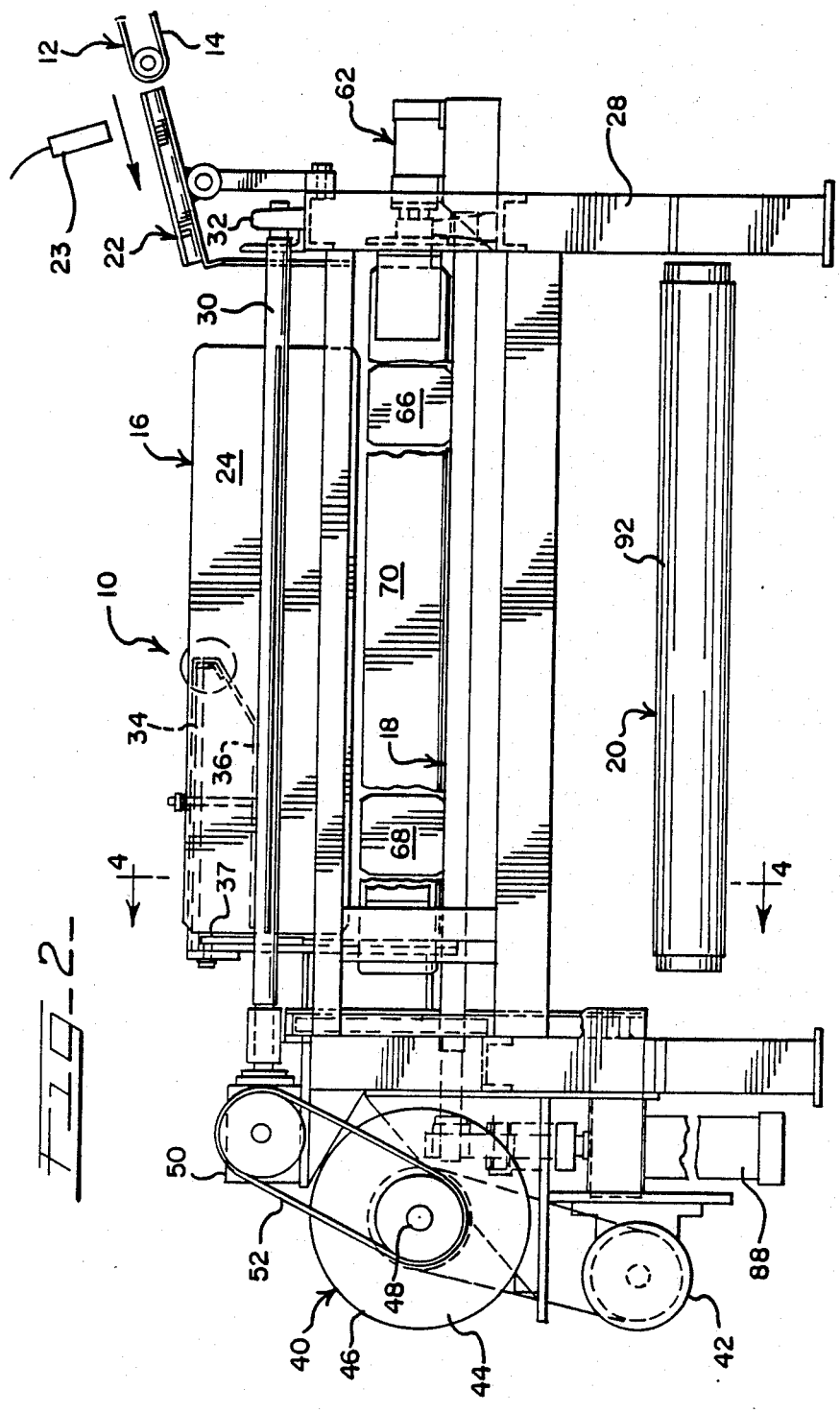

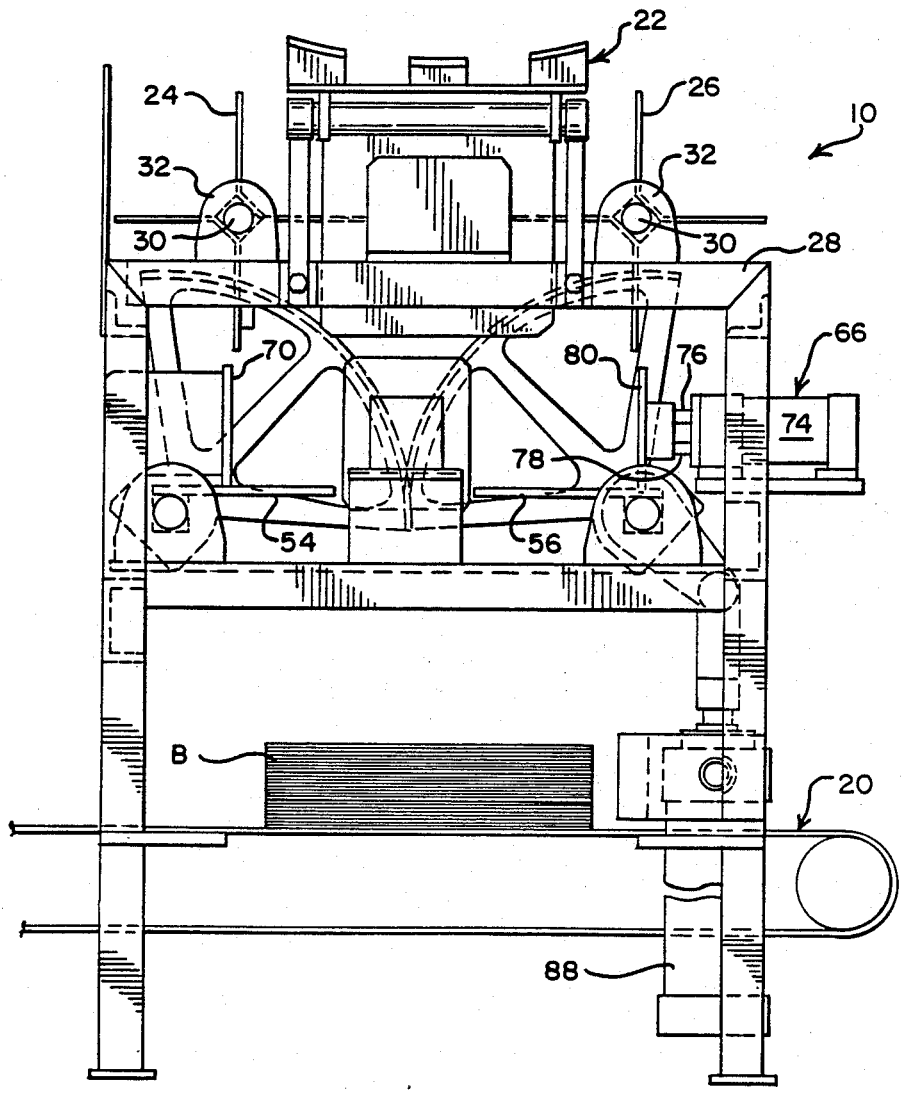

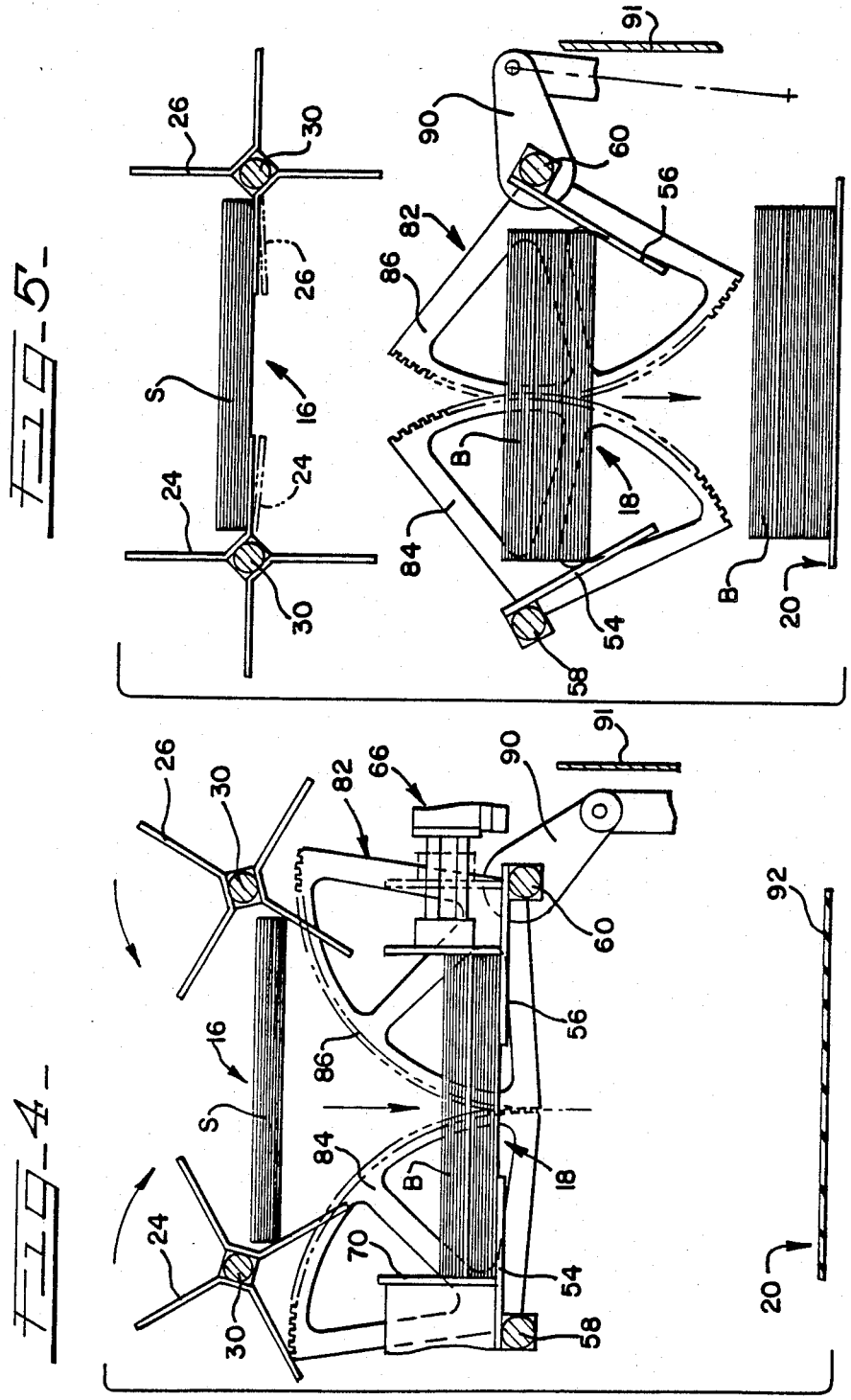

SHINGLE STACKING MACHINE

FIELD OF THE INVENTION

The present invention relates to production lines wherein asphalt shingles and the like are cut from a web of material and, more particularly, to an improved apparatus for stacking the asphalt shingles after they are cut.

BACKGROUND OF THE INVENTION

A typical shingle comprises an asphalt impregnated heavy paper stock having mineral granules embedded in one face thereof. The shingles are typically cut to a generally rectangular shape and include one or more slits which define separate tabs on each shingle.

The shingles are cut, stacked, and packaged in bundles on a single continuously operating production line. Typically, a wide web of paper stock progresses continuously along a production line at a very high rate of speed through successive stages of impregnating the web with liquid asphalt, coating with mineral granules, cutting the web into appropriately sized shingles, stacking of individual shingles in superposed relation relative to each other, and bundling the stacked shingles together.

During the cutting stage, the coated and continuously moving web is slit into longitudinal strips and these strips are cut transversely to a rectangular size. During the cutting stage, the tabs are formed by cutting out narrow slits extending inwardly from one side edge of a shingle.

The strips into which the web is slit continue to longitudinally move at very high speeds (700–900 feet per minute) along the production line in what will be referred to as individual "lanes". Typically, a shingle production line may have three or more such "lanes" along which the slit web is advanced. A stacker machine is arranged at one end of each lane for receiving the shingles successively delivered thereto, stacking the shingles in a superposed relation, and forming individual bundles of shingles. The bundles of shingles are automatically removed from the stacking machine and are subsequently wrapped for delivery to a customer.

U.S. Pat. No. 3,205,794 to F. L. Califano et al. discloses a stacking machine which includes a group-assembling and transfer section, and a stack assembling and squaring section. The group-assembling and transfer section includes a pair of rotatable paddle-like elements or starwheels disposed on opposite sides of shingles advanced to the stacking station. Each starwheel includes a series of shingle support flights or shelves that receive and support shingles after they have been individually cut. As the shingles are received they are slid one on top of another to form a stack comprised of a predetermined number of shingles.

After a predetermined number of shingles have been received and stacked at the group assembling and transfer section, the starwheels are rotated to drop the stack of shingles to the stack assembling and squaring section while concurrently presenting another support flight or shelf to receive the next advancing shingle. At the stack assembling and squaring section, the edges of the shingles are aligned relative to each other. The shingles are thereafter transported away from the stacking machine to a wrapping station.

The stacking machine receives fresh shingles which are still soft and have their mineral granules only loosely held thereon. As will be understood, the softness of the shingles impedes alignment of the shingle edges relative to each other at the group assembling section. Moreover, because the shingles are slid over each other at the group-assembling and transfer section, many of the mineral granules are dislodged from the shingle and are deposited on working parts of the stacker machine. These mineral granules accumulate and because of their coarseness quickly cause wear of the moving parts of the stacker machine.

When shingles enter the stacking machine, they travel at several hundred feet per minute. During starwheel rotation the leading edge of the starwheel rotates in a plane generally transverse to the direction of shingle advancement. To avoid damage to the shingles, the starwheels of the stacker machine must, therefore, be rotatably indexed between positions in only the short time interval between adjacent advancing shingles. As will be appreciated, if the starwheels are not sufficiently indexed between positions in a timely manner, the movement of the starwheel will strike an advancing shingle in a manner impeding shingle advancement toward the group assembling and transfer section and, ultimately causing a jam of the production line.

A major concern during operation of a shingle production line is the elimination of any condition that requires a stopping or slowing down of the web or shingles advancing along the line. This can be particularly significant when considering that any of a variety of possible occurrences at any of the numerous stacker machines or on any of the lanes, such as a jam, may require an interruption or halt of an entire six-lane production line simply because of a jam-up or other occurrence in only one of the lanes.

Any attempt at increasing production line speeds requires increases in the already rapid operation of the stacker machine to adjust to the increased number of shingles being presented thereto. Moreover, the stacking machines must be of relatively inexpensive, straightforward, rugged and dependable construction to avoid costly repair shutdowns, and also considering the substantial number of these units needed to accommodate the one or more production lines.

SUMMARY OF THE INVENTION

In view of the above, and in accordance with the present invention, there is provided a shingle stacking machine having an improved drive mechanism which facilitates a significant increase in production line speeds without a proportional increase in down-time resulting from shingle jam-ups. The shingle stacking machine of the present invention receives freshly manufactured shingles traveling at a high production rate along a lane of a fully automated shingle manufacturing facility.

The stacking machine of the present invention includes a shingle stacking station, a shingle bundling station, and a conveyor for automatically removing bundled shingles from the area of the machine. To facilitate an increase in the already high production rate of the shingle manufacturing machine, the stacking machine includes a vacuum operated drive mechanism having extremely fast actuating times and which provides smoother acceleration and deceleration rates for the shingle stacking station of the present invention.

The shingle stacking station of the present invention receives shingles from a production lane conveyor and stacks the shingles in a superposed relationship. The stacking station includes first and second generally parallel and elongated wheel assemblies which are rotatably mounted on a frame on opposite sides of the shingle. Each wheel assembly is rotatably mounted about a fixed axis and includes a plurality of support members which radially extend from the axis about which they rotate. One support member on one wheel assembly normally extends inward toward a like support member on the other wheel assembly at substantially the same level.

The drive mechanism for automatically indexing the wheel assemblies is preferably operable in a drive mode and a jam mode. During the drive mode, the drive mechanism rotatably indexes each wheel assembly after predetermined number of shingles have been stacked thereon. In a jam mode, the drive mechanism permits free wheeling of the wheel assemblies in a manner facilitating quick and easy clearing of a jammed shingle.

In its preferred form, the drive mechanism includes a continuously driven vacuum operated clutch assembly which uses electromagnetic valves for developing fluid pressure differentials within the clutch assembly. The clutch assembly includes a drive shaft which is operated under the influence of the electromagnetic valves and which extends substantially normal to the wheel assemblies. The drive shaft is connected to the wheel assemblies so as to rotate the support members in a timely manner with respect to and between adjacent advancing shingles. An elastomeric drive belt is preferably used for interconnecting the drive shaft with at least one of the wheel assemblies. The extremely fast actuation time of the vacuum operated clutch assembly allows the wheel assemblies of the stacking station to completely index between successively advancing shingles while concurrently providing a significant increase in the already high production rate of a conventional shingle making machine.

The shingle bundling station is disposed beneath the shingle stacking station for receiving and bundling small stacks of shingles received from the stacking station. The bundling station includes a pair of shelf-like supports which are pivotally carried on the machine frame and are normally disposed in a generally horizontal orientation for supporting the shingles dropped from the shingle stacking station. The shelf-like supports are interconnected by a gear arrangement which positively drives the supports in opposite directions. In a preferred form, the gears are driven by a dual acting, linearly operated pneumatic cylinder.

The bundling station further includes a mechanism for squaring the edges of the shingles relative to each other. The superposed end edges of the stacked shingles are moved relative to each other by shifting the shingles into vertical alignment with each other with a non-rotating double rod cylinder pushing the end edges against an end alignment plate. The superposed side edges of the stacked shingles are moved relative to each other by shifting the shingles into vertical alignment with each other with a pair of laterally spaced non-rotating double rod cylinders pushing the side edges of the shingles against a side alignment plate.

Each of the double rod cylinders used at the bundling station have a generally rectangular squaring plate affixed to an operable end thereof. The non-rotating double rod cylinders used with the present invention are capable of handling high side loading. Moreover, such cylinders are preferably of non-lube construction to prevent adhesion of granular materials thereto and thereby reduce wear on the moving parts of the machine. The squaring plate secured to the operative end of each double rod cylinder is generally rectangular to promote squaring of the shingle stack.

Numerous other features and advantages of the present invention will become readily apparent from the following detailed description, the accompanying drawings, and the appended claims.

BRIEF DESCRIPTION OF THE DRAWINGS

FIG. 1 is a perspective view of a shingle stacking machine according to the present invention;

FIG. 2 is a front elevational view, partially broken away, illustrating the stacking machine of the present invention;

FIG. 3 is a side elevational view of the present invention;

FIG. 4 is a simplified sectional view taken along line 4—4 of FIG. 2 illustrating a stack of shingles dropping toward a bundling station; and FIG. 5 is a view similar to FIG. 4 showing a bundle of shingles dropping toward a conveyor system of the present invention.

DETAILED DESCRIPTION OF THE PREFERRED EMBODIMENT

While the present invention is susceptible of embodiment in various forms, there shown in the drawings, and will hereinafter to be described, a preferred embodiment with the understanding that the present disclosure is to be considered as an exemplification of the invention and is not intended to limit the invention to the specific embodiment illustrated.

Referring now to the drawings, wherein like reference numerals indicate like parts throughout the several views, a shingle stacking machine 10 is illustrated as being arranged at a downstream end of a shingle production machine which is depicted only fragmentarily and is seen as represented in its entirety by reference numeral 12. Although this invention will be described in its application to the solution of certain problems involved in asphalt shingle manufacturing production lines, it will be recognized that this invention is equally applicable to other manufacturing situations wherein the same basic problems are involved.

The shingle production machine 12 includes a belt conveyor 14 which is driven at a speed slightly in excess of the speed of a shingle cutter (not shown) whereby leading shingles are accelerated relative to trailing shingles to establish linear spacing between the trailing edge of one shingle and the leading edge of the next succeeding shingle. Shingles are rapidly delivered from the conveyor 14 and are delivered in successive order to the shingle stacking machine.

Generally stated, the shingle stacking machine 10 includes a shingle stacking station 16, a shingle bundling station 18, and a conveyor apparatus 20. The purpose of the shingle stacking station 16 is to receive and support shingles delivered at high speed from the conveyor 14. In response to a signal indicating that a predetermined number of shingles have been received at station 16, the stack of shingles is transferred to the bundling station 18. As illustrated in FIGS. 4 and 5, each stack of shingles prior to transfer to the bundling station 18, is designated "S" and will be so referred to throughout this description.

The purpose of the bundling section 18 is to receive various stacks of shingles and arrange same in a bundle, which is identified herein by the letter "B". Bundling of the various stacks received from station 16 further involves both an endwise and a sidewise alignment of the edges of the shingle. From the bundling station 18, a bundle B is deposited onto the conveyor apparatus 20 which removes the bundle B from the machine 10 to a remote location whereat the bundled shingles may be wrapped for delivery to a customer. The circuitry for operating the shingle stacking station 16, bundle station 18, and conveyor apparatus in timed coordination relative to each other is illustrated in the above-identified Califano et al. patent;

From the belt conveyor 14, the shingles proceed across an adjustable, inclined ramp or guide plate 22, operatively positioned between the conveyor 14 and the shingle stacking station 16, toward the shingle stacking station 16. A suitable counting means 23 (FIG. 2) is provided for monitoring the number of shingles advanced toward the stacking station 16. Preferably, such counting means 23 is in the form of a proximity type sensor or a fiber optic sensor arranged in the area of the guide plate 22 upstream of station 16.

Notably, the inclined guide plate 22 has been specifically configured to transversely "cup" or shape each shingle to a generally upwardly concave configuration to thereby lend rigidity to each shingle along the longitudinal axis thereof. This action desirably enhances the stability and precision with which the shingles are handled.

As illustrated the guide plate 22 defines a generally upwardly concave guide surface across which the shingles move as they are transferred from the conveyor 14 to the stacking station. In this regard, the guide surface preferably comprises a ceramic material for wear-resistance. The rigidity thus imparted to the shingles is much in the nature of that which is imparted to a sheet of paper as it is cupped or concaved slightly, and has been found to facilitate stable, vertically aligned stacking of the shingles.

The shingle stacking station 16 is defined by first and second generally parallel and elongated wheel assemblies 24 and 26 which are spaced on opposite side edges of an advancing shingle. Each wheel is adapted to rotate about a fixed axis on a frame 28 of the machine 10. In a preferred form, each wheel assembly is in the form of a "starwheel" in that it includes an elongated support shaft 30 and has a plurality of shingle supporting flights or shelves extending radially from and in alignment with a central wheel hub coaxially arranged about shaft 30. One end of each support shaft 30 is rotatably mounted in a bearing support 32 secured to the frame 28 of the machine.

Although four shelves are associated with each wheel assembly in the embodiment described, other numbers, such as two or three shelves, can be associated with each such shaft with appropriate modifications in the machine controls. One shelf on one wheel assembly normally extends inward toward a like shelf on the other wheel assembly at substantially the same level to provide a support for receiving shingles advanced thereto by the conveyor and supporting the shingles in a superposed relationship thereon.

In a preferred form of the invention, a brake assembly 34 is provided at a far end of the shingle stacking station 16. As illustrated, brake assembly 34 includes a partially inclined plate 36 which engages and provides a guiding and dampening effect to shingles entering the shingle stacking station 16. Plate 36 furthermore urges the advancing shingles toward the support flights on the wheel assemblies 24 and 26.

In the illustrated embodiment, a vertically oriented stop plate 37 is provided at the shingle stacking station 16 adjacent the wheel assemblies 24 and 26 (see FIG. 2). Stop plate 37 is positioned such that the shingles advancing into the stacking station impact thereagainst, and are thus further guided into position on the wheel assemblies. The stop plate 37 preferably comprises elastomeric material, which in a current embodiment is provided in the form of a layer of polyurethane about 0.25 inches thick. The provision of the elastomeric material desirably acts to absorb the impact of the shingles thus enhancing settling and stacking of the shingles on the wheel assemblies.

A drive mechanism 40 is mounted to the frame 28 of the machine 10. The drive mechanism 40 is operable in a drive mode for indexing the wheel assemblies 24 and 26 after a predetermined number of shingles have been stacked thereon and in a jam mode which permits free wheeling of the wheel assemblies so as to remove jammed shingles therefrom. The drive mechanism 40 includes a motor 42 adapted to drive a clutch assembly 44 which, in turn, drives the wheel assemblies 24 and 26.

Preferably, motor 42 is an electrically operated, continuously running motor of compact design which is suitably affixed to the frame 28 of the machine 10. The motor is designed with approximately a 500 percent overload capacity and has sufficient power to rotatably index the wheel assemblies 24 and 26 in a timely manner facilitating a significant increase in shingle production line rate.

As illustrated in FIG. 2, the clutch assembly 44 is interposed between motor 42 and the drive wheels 24 and 26. The clutch assembly 44 is preferably constructed in accordance with U.S. Pat. Nos. 3,378,121 and 4,381,833 to P. G. Foret; the teachings of which relating to a vacuum operated clutch assembly are incorporated herein by reference.

Clutch assembly 44 is a vacuum operated assembly having extremely fast actuation times and which is capable of handling higher horsepower inertia forces than other types of clutch assemblies. The clutch assembly 44 includes a fly-wheel (not shown) which is rotatably and continuously driven by the motor 42. The clutch assembly 44 further includes a housing 46 having a pair of electromagnetic valves for controlling driving and braking operations of a drive shaft 48 rotatably mounted within housing 46. Selective actuation of the electromagnetic valves regulates a drive connection between the continuously rotating fly-wheel and the drive shaft 48. Operation of the clutch assembly is constant without erratic movement and can have responses at least as low as about 0.007 second to close and about 0.0018 second to open. Moreover, the clutch assembly 44 allows the wheel assemblies 24 and 26 to free wheel in order to remove any jammed shingles from the shingle stacking station 16.

A right angle gear box 50 is connected to and rotatably supports the opposite end of each of the wheel assemblies 24 and 26. Each gear box 50 is affixed to the frame 28 of the machine 10 and is totally enclosed and lubricated. The gear boxes are interconnected in a driving relationship with each other and to the drive shaft 48 of the clutch assembly 44. Preferably, an elastomeric drive belt 52 is used to transfer rotary power between the drive shaft 48 and the gear boxes 50

The shingle bundling station 18 includes a pair of shelf-like supports 54 and 56 which are pivotally arranged on the frame 28 of the machine 10 by a pair of supporting and driving shafts 58 and 60, respectively. As illustrated, the supports 54 and 56 are disposed below the shingle stacking station 16 and extend inwardly toward each other at substantially the same level to define a movable support adapted to receive a shingle stack S dropped from the shingle stacking station 16.

When a shingle stack S is dropped to the bundling station 18, the shingles in the stack S are squared by aligning both endwise and sidewise edges of the superposed shingles. Endwise squaring of the shingle stack S is accomplished by a driver 62 acting in cooperation with end alignment plate 64 (FIG. 1) preferably affixed to the frame 28. Sidewise alignment of the shingle stack S is accomplished by a pair of laterally spaced drivers 66 and 68 (FIG. 2) which act in combination with elongated side alignment plate 70 (FIG. 3) which is preferably affixed to the frame 28 of the machine 10.

Because each of the drivers 64, 66 and 68 are substantially similar, only driver 66 will be discussed in detail with the understanding that the other drivers are similarly constructed. Turning now to FIG. 3, each driver includes a double rod cylinder unit 74 having at least two push rods 76 and 78 extending from its operative end. Each cylinder unit 74 is suitably secured to the frame 28 of the machine. Moreover, each cylinder unit is of non-lube construction to prevent adhesion of grit and granular materials to the push rods 76 and 78. Secured to the free end of the push rods 76 and 78 is a generally rectangular or square plate 80, which provides a greater reactive surface area for squaring than a round plate, and thus promotes better alignment of the edges of the shingles. Plate 80 is attached to each of the push rods 76 and 78 such that it cannot rotate relative thereto, thus obviating any interference with supports 54 and 56.

After, a predetermined number of shingle stacks S have been transferred to and squared at the shingle bundling station 18 to form a shingle bundle B, the shelf-like supports 54 and 56 are moved from a substantially horizontal position to a generally vertical position to deposit the bundle B on conveyor apparatus 20.

A drive mechanism 82 is provided for effecting movement of the shelf-like support members 54 and 56. The drive mechanism 82 includes a pair of intermeshing gear segments 84 and 86 which are non-rotatably connected to shafts 58 and 60, respectively. The gear segments 84 and 86 rotate about the axes of shafts 58 and 60, respectively and are driven by a linear actuator 88 (FIG. 3) preferably in the form of a double acting pneumatic cylinder. In a preferred form, a crank arm 90 radially extends from and is affixed to shaft 60. The free end of arm 90 is articulately connected to the operative end of actuator 88. A housing 91 is provided to enclose and protect the gear segments 84, 86 and the actuator 88.

When the shelf-like supports 54 and 56 are driven into their substantially vertical position (FIG. 5), the shingle bundle B drops from the bundling station 18 onto the conveyor apparatus 20. The conveyor apparatus 20 includes a driven belt-like conveyor 92 extending transverse to the length of machine 10 and which serves to remove a bundle B from the area of the machine 10 and deliver the bundle B to suitable equipment for packaging and other handling thereof.

In operation, the shingle stacking machine 10 receives shingles from the conveyor 14. The shingles delivered from the conveyor are guided by the guide plate 22 toward the shingle stacking station 16 of the machine 10. The counting means 23, arranged approximate to the guide plate 22, counts the shingles passing to the shingle stacking station 16.

The brake assembly 34 at the rear end of the stacker station slows the advancing shingle in a manner dampening shingle entry to the shingle stacking station 18. The brake assembly 34 also directs the shingle downwardly toward the flights of the wheel assemblies 24 and 26.

The wheel assemblies 24 and 26 defining the shingle stacking station 16 each include a plurality of flights or shelves extending radially from and in alignment with a common axis or hub, which in the present case is the shaft 30 about which the wheel assemblies rotate. The shelves on the wheel assemblies are evenly spaced circumferentially, preferably at 90 degrees. Although circumferential spacings of 180 degrees (with two shelves) or 120 degrees (with three shelves) can be employed, the smaller circumferential spacing of 90 degrees is preferable because, while a group of shingles is being transferred downwardly through rotation of the wheel assemblies, the next empty shelf can be more quickly rotated into position to receive the shingles rapidly following from the conveyor 14.

As is evident from FIGS. 4 and 5, after a predetermined number of shingles are arranged at station 16 to form a stack S, the wheel assemblies 24 and 26 are rotated in a manner transferring the stack S to the bundling station 18. With the very fast linear speed of the advancing shingles, the speed with which the wheel assemblies must be rotated or indexed between positions is evident.

A significant feature of the present invention is the drive mechanism 40 which offers many beneficial features and yields a significant increase (approximately a 150 feet per minute increase) in the production rate of the shingle production machine. The drive mechanism 40 of the present invention allows the wheel assemblies 24 and 26 to turn about 50 percent faster than was heretofore known. Moreover, the drive mechanism of the present invention provides smoother acceleration and deceleration of the wheel assemblies in a manner reducing vibrations of the wheel assemblies 24 and 26 and thereby improving performance of the stacking station. The use of an independent continuously running motor provides increased power input for driving the clutch assembly and furthermore facilitates an increase in the heretofore known width of the shingle supporting flights to enhance shingle support. The elastomeric drive belt 52 used with the drive mechanism 40 does not require lubrication, is quieter than heretofore known belts, and has a longer life than other known force transfer mechanisms.

The provision of a drive mechanism having a vacuum operated clutch assembly 44 with magnetic valves offers extremely fast actuation times for driving the wheel assemblies 24 and 26 between positions and thereby reduces the possibility of jams. Moreover, a vacuum operated clutch can have maximum heat load frequency ratings at least 50 percent higher than other clutching devices. The electromagnetic valves used in combination with the clutch assembly 44 can be simply constructed, and are configured to promote long valve life. Furthermore, incorporation of such a clutch assembly within the drive mechanism allows the drive mechanism to be operated in both a drive mode and a jam mode. The provision of a jam mode facilitates jam clearing and the like, and reduces down time for the stacker machine.

A further feature of this drive arrangement concerns the precision with which the wheel assemblies 24 and 26 can be indexed and positioned, and their ready adjustability (via the electronic controls) of the index or reference points of the wheel assemblies. In this regard, it can be desirable to adjust the reference points so that flights or shelves of the wheel assemblies are not perfectly horizontal when receiving shingles, but rather are inclined slightly downwardly toward each other, as shown in phantom line in FIG. 5. This acts to transversely cup the shingles, generally as described above in connection with the concave guide plate 22. This permits the wheel assemblies to cooperate with the guide plate for further enhancing the stability with which the shingles are handled as the upwardly concave shingles tend to settle atop one another in vertically aligned and nested relationship.

The gear boxes 50 are interconnected with each other and the clutch assembly 44 to provide a positive drive arrangement for each of the wheel assemblies 24 and 26. Because they are enclosed and self-lubricated, the gear boxes require less maintenance, and the grit laden environment does not adversely affect their driving performance. Moreover, the provision of a gear box promotes the ability to offset each wheel assembly from horizontal.

Several stacks of shingles presented to the bundling station 18 form a bundle B. The bundling station is defined by the shelf-like supports 54 and 56 which are non-rotatably mounted on shafts 58 and 60. Opposite ends of shafts 58 and 60 are rotatably supported by the frame 28 to allow easy adjustment of the horizontal position of shelves 54 and 56. The orientation of the shelves 54 and 56 is controlled by the drive mechanism 82 which has a simple one cylinder actuation for consistent movement. In FIG. 4, the shelves or supports 54 and 56 are shown in their normal or rest position wherein the supports 54 and 56 are horizontally oriented to support a bundle B of shingles. The drive mechanism 82 is designed to provide maximum holding power for the shingle bundle B. In response to a signal generated by the control circuitry, the actuator 88 moves the crank arm 90 which in turn drives the gear segments 84 and 86 to thereby rotate the support shafts 58 and 60 from their starting or rest position to a position wherein the bundle B is allowed to drop to the conveyor 20. The gears segments 84 and 86 and actuator 88 are totally enclosed and protected against environmental damage by housing 91.

When the shingle stack S is deposited at the bundling station 18, drivers 64, 66 and 68 are operated to square the shingles in the stack S relative to each other and relative to other stacks deposited at the bundling station. The normal position of the drivers is illustrated in FIG. 3 whereat the plates 80 are in a retracted position. Translatory movement of the plate 80 on each driver is effected in response to a signal generated from the control circuitry. The non-lubricated structure of drivers 64, 66 and 68 facilitates improved imperformance in a grit laden environment in which the present invention find utility. Moreover, the cylinders 74 and plates 80 are easily replaceable due to a clear open area provided at the bundle stacking station.

Drivers 68 and 70, which are used to align the side edges of the shingles, are laterally spaced apart to maximize the squaring effect on the shingle stack S. The stationary alignment plate 80 against which the side edges of the shingles are aligned extends along one side of the frame 28 and is designed for ease of replacement.

After a predetermined number of shingles are deposited at the bundling station, the bundle B is then deposited on the conveyor apparatus 20, for transporting the bundles B to a location for subsequent handling.

This invention has been described in terms of specific embodiments set forth in detail, but it should be understood that this is by way of illustration only and that the invention is not necessarily limited thereto. Modifications and variations will be apparent from the disclosure and may be resorted to without departing from the spirit of the invention, as those skilled in the art will readily understand. Accordingly, such variations and modifications of the disclosed products are considered to be within the purview and scope of the invention and the following claims.

What is claimed is:

1. A shingle stacking machine for receiving shingles rapidly delivered thereto from a conveyor in successive order, said machine comprising:

a frame;

shingle supporting means for receiving shingles from said conveyor and supporting said shingles in a superposed relationship, said supporting means including a pair of generally parallel and elongated horizontal wheel assemblies, each wheel assembly being rotatably mounted on said frame about a fixed axis and includes a plurality of planar support members radially extending from said axis, with one support member on one wheel assembly normally extending inward toward a support member on the other wheel assembly at substantially the same level in substantially the same horizontal plane;

a pair of shelf-like supports pivotally carried on said frame for receiving, holding, and transferring a stack of shingles dropped from said shingle supporting means;

means for intermittently indexing said shingle supporting means, said indexing means including a continuously driven vacuum operated clutch assembly for intermittently driving said wheel assemblies, said clutch assembly including electromagnetic valve means for controlling operation of a drive shaft which rotatably drives said wheel assemblies, via drive means operatively connecting said drive shaft with said wheel assemblies, in timed relation with the advancing shingles and after a predetermined number of shingles have been stacked on said shingle supporting means; and means for cupping said shingles as they are received on said shingle supporting means from said conveyor, said cupping means comprising inclined guide plate means operatively positioned between said conveyor and said shingle supporting means and defining a generally upwardly concave guide surface for imparting a generally upward concave, transversely cupped configuration to said shingles as they are received on said wheel assemblies of said shingle supporting means to thereby enhance the rigidity of each shingle along the longitudinal axis thereof, wherein said electromagnetic valve means are operable to position said elongated wheel assemblies so that a support member on one of said wheel assemblies and a like support member on the other of said wheel assemblies are inclined slightly downwardly toward each other upon receiving said shingles to cooperate with said cupping means to transversely cup said shingles.

2. A shingle stacking machine according to claim 1 wherein each wheel assembly includes an elongated support shaft having a wheel defining said support members coaxially mounted thereon.

3. A shingle stacking machine according to claim 1 further including a pair of intermeshing rotatable gears connected to a driver for positively driving said shelf-like supports in either of two opposed directions.

4. A shingle stacking machine according to claim 3 wherein said driver includes a dual acting linearly operated pneumatic cylinder.

5. A shingle stacking machine according to claim 1 wherein said drive means includes an elastomeric drive belt for connecting said drive shaft with at least one of said wheel assemblies.

6. A shingle stacking machine according to claim 1, including means for squaring shingles deposited on said shelf-like supports relative to each other by shifting the shingles into vertical alignment with each other and against end and side alignment plates, wherein said shingle squaring means includes a non-rotating double rod cylinder having a generally rectangular squaring plate affixed to each of the double rods of said cylinder to prevent rotation of said squaring plate during squaring of the shingles.

7. The shingle stacking machine according to claim 1, wherein the guide surface of said inclined guide plate means comprises ceramic material for wear-resistance.

8. The shingle stacking machine according to claim 6 including vertically oriented stop plate means positioned adjacent to said wheel assemblies at said shingle stacking station, said stop plate means comprising elastomeric material for absorbing the impact of shingles impacting against said stop plate means as the shingles are received at said stacking station.

* * * * *